(12) United States Patent
Tanghetti et al.

(10) Patent No.: US 10,900,208 B2
(45) Date of Patent: Jan. 26, 2021

(54) BALL FOR A HYDRAULIC COMPONENT, FLOW CHANGER INSERT COMPRISING SAID BALL AND TAP COMPRISING SAID BALL

(71) Applicant: EFFEBI S.p.A, Bovezzo (IT)

(72) Inventors: Ermanno Tanghetti, Concesio (IT); Alberto Sala, Concesio (IT)

(73) Assignee: EFFEBI S.P.A., Bovezzo (IT)

( * ) Notice: Subject to any disclaimer, the term of this patent is extended or adjusted under 35 U.S.C. 154(b) by 108 days.

(21) Appl. No.: 15/920,699

(22) Filed: Mar. 14, 2018

(65) Prior Publication Data
US 2018/0266090 A1 Sep. 20, 2018

(30) Foreign Application Priority Data
Mar. 14, 2017 (IT) .................. 102017000028274

(51) Int. Cl.
*E03C 1/084* (2006.01)
*F16K 5/06* (2006.01)
*B05B 1/30* (2006.01)
*F16K 27/06* (2006.01)
*B05B 1/16* (2006.01)
*F16K 47/04* (2006.01)
*F16K 5/10* (2006.01)
*B05B 3/04* (2006.01)
(Continued)

(52) U.S. Cl.
CPC ............ *E03C 1/084* (2013.01); *B05B 1/1645* (2013.01); *B05B 1/3026* (2013.01); *B05B 3/04* (2013.01); *F16K 5/0605* (2013.01); *F16K 5/0647* (2013.01); *F16K 5/10* (2013.01); *F16K 15/18* (2013.01); *F16K 27/067* (2013.01); *F16K 47/045* (2013.01); *B05B 15/534* (2018.02)

(58) Field of Classification Search
CPC ........ E03C 1/084; F16K 15/18; F16K 5/0647; F16K 5/0605; F16K 5/10; F16K 47/045; F16K 27/067; B05B 3/04; B05B 1/3026; B05B 1/1645; B05B 15/534
USPC ......................................................... 251/339
See application file for complete search history.

(56) References Cited

U.S. PATENT DOCUMENTS 3,352,155 A * 11/1967 Penet .................. G01F 1/10
73/198
3,386,461 A * 6/1968 Fisher ................. F16K 5/10
137/237
(Continued)

FOREIGN PATENT DOCUMENTS

DE 20209477 11/2002
DE 102005011947 9/2006
(Continued)

OTHER PUBLICATIONS

European Examination Report for EP 18161527.9 dated Jul. 10, 2019, pp. 1-5.
(Continued)

*Primary Examiner* — Umashankar Venkatesan
*Assistant Examiner* — Andrew J Rost
(74) *Attorney, Agent, or Firm* — Workman Nydegger

(57) ABSTRACT

A ball for a hydraulic component comprises a spherical body provided with at least one first through channel, which extends along a first axis; and at least one flow changer element arranged along the first through channel.

17 Claims, 4 Drawing Sheets

(51) Int. Cl.
  *F16K 15/18* (2006.01)
  *B05B 15/534* (2018.01)

(56) References Cited

U.S. PATENT DOCUMENTS

| | | | | |
|---|---|---|---|---|
| 3,955,763 A * | 5/1976 | Pyle | ............... | B05B 15/534 |
| | | | | 239/119 |
| 4,371,146 A * | 2/1983 | Mese | ............... | F16K 5/0605 |
| | | | | 137/614.17 |
| 4,629,121 A * | 12/1986 | Hengesbach | ......... | B05B 1/1636 |
| | | | | 239/119 |
| 4,635,850 A * | 1/1987 | Leisi | ............... | B05B 1/326 |
| | | | | 239/119 |
| 4,846,221 A | 7/1989 | Kanemaru | | |
| 5,586,579 A * | 12/1996 | Diehl | ............... | F16K 5/0605 |
| | | | | 137/493.8 |
| 5,850,946 A | 12/1998 | Keller et al. | | |
| 5,887,793 A * | 3/1999 | Kieffer | ............ | B05B 15/534 |
| | | | | 239/119 |
| 6,164,115 A * | 12/2000 | Higuchi | ......... | B21D 19/08 |
| | | | | 72/315 |
| 6,415,994 B1 * | 7/2002 | Boggs | ............ | B05B 1/3415 |
| | | | | 239/463 |
| 6,863,229 B1 * | 3/2005 | Leisi | ............... | B05B 15/534 |
| | | | | 239/418 |
| 6,913,042 B2 * | 7/2005 | Tran | ............... | F16K 5/0605 |
| | | | | 137/625.3 |
| 7,472,846 B2 * | 1/2009 | Thomas | ......... | E03C 1/084 |
| | | | | 239/391 |
| 8,141,843 B2 * | 3/2012 | Rimboym | ......... | F16K 5/0605 |
| | | | | 251/127 |
| 8,365,755 B2 * | 2/2013 | Hawkes | ......... | F16K 27/067 |
| | | | | 137/15.18 |
| 9,409,591 B2 * | 8/2016 | Johta | ............... | B62D 1/184 |
| 2002/0070248 A1 | 6/2002 | Lohr | | |
| 2004/0195354 A1 | 10/2004 | Leisi | | |
| 2008/0135794 A1 | 6/2008 | Shnider et al. | | |

FOREIGN PATENT DOCUMENTS

| | | |
|---|---|---|
| EP | 1013976 | 6/2000 |
| EP | 3106720 | 12/2016 |

OTHER PUBLICATIONS

Search Report issued in Italian Application No. 201700028274 dated Dec. 6, 2017.

* cited by examiner

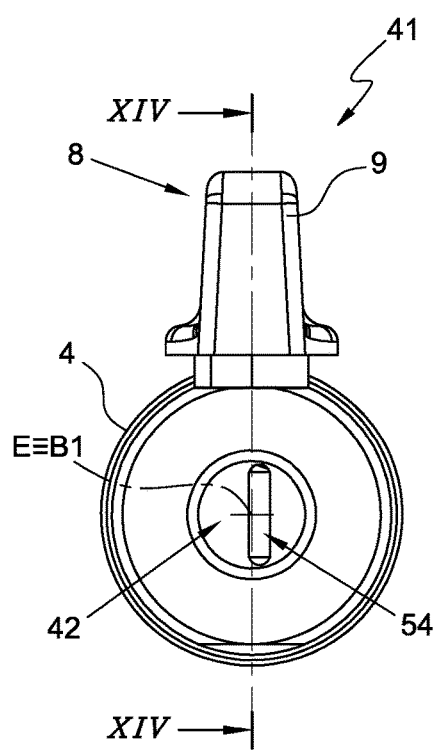 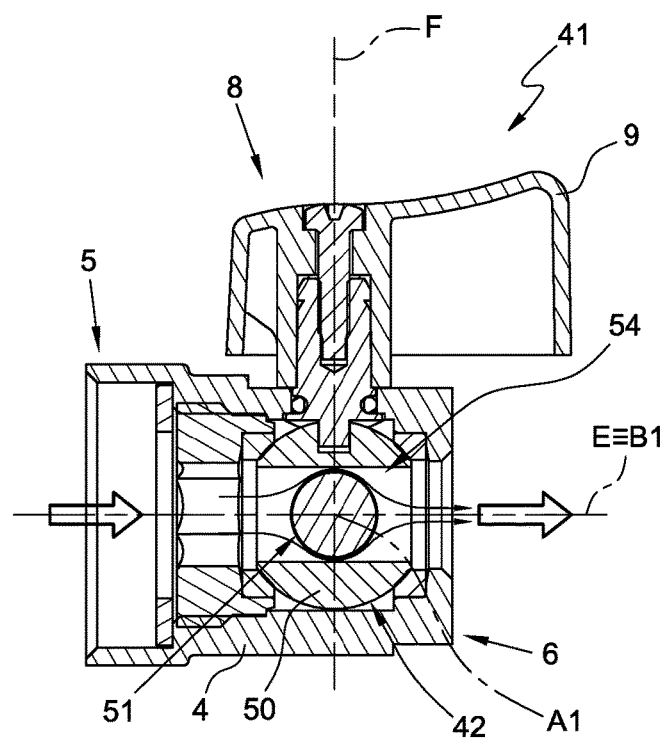
FIG. 13
FIG. 14
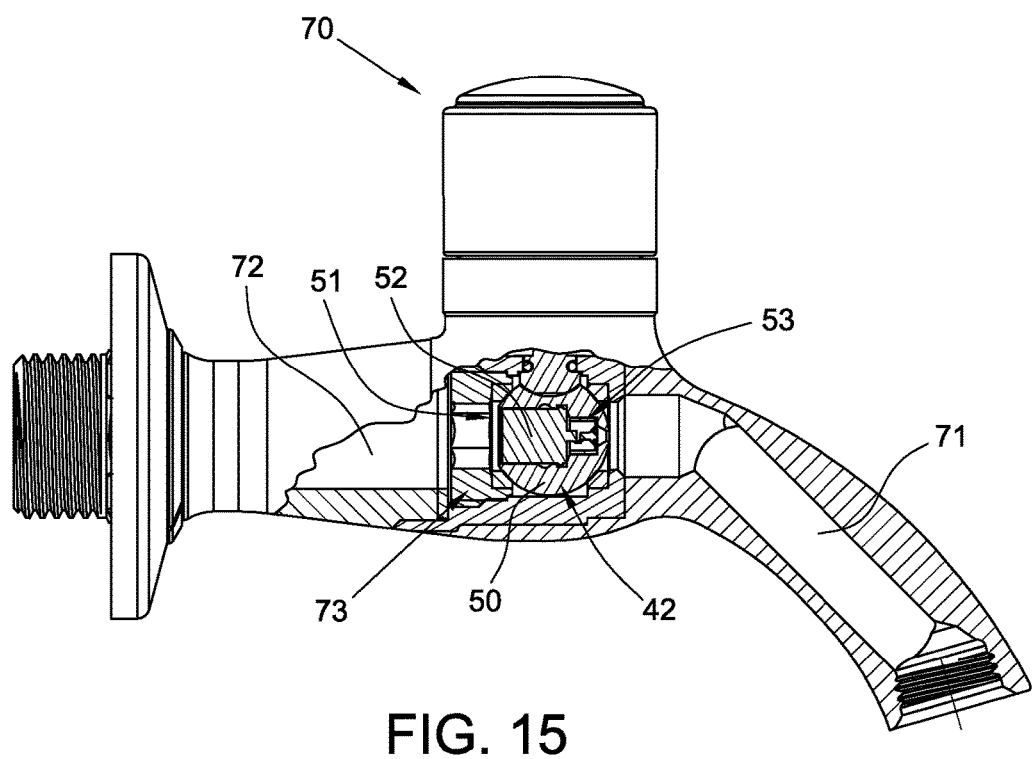
FIG. 15

BALL FOR A HYDRAULIC COMPONENT, FLOW CHANGER INSERT COMPRISING SAID BALL AND TAP COMPRISING SAID BALL

PRIORITY CLAIM

This application claims priority from Italian Patent Application No. 102017000028274 filed on Mar. 14, 2017, the disclosure of which is incorporated by reference.

TECHNICAL FIELD

The present invention relates to a ball for a hydraulic component.

The present invention also relates to a nebulizer insert comprising said ball and a tap comprising said ball.

The present invention aims at providing a ball for a hydraulic component, which is able to respond to the ever-increasing need to reduce consumption.

BACKGROUND OF THE INVENTION

The currently known balls are usually employed in ball valves and are configured to allow the passage of a given water flow rate when the valve is open and prevent the passage of water when the valve is closed.

However, the balls used in this type of hydraulic application are not capable of selectively reducing the fluid consumption of the component in which they are installed.

SUMMARY OF THE INVENTION

It is therefore an object of the present invention to provide a ball, which is capable of selectively reducing the consumption by the hydraulic component in which it is installed.

In accordance with these objects, the present invention relates to a ball for a hydraulic component comprising:
- a spherical body provided with at least one first through channel, which extends along a first axis;
- at least one flow changer element arranged along the first through channel.

It is a further object of the present invention to provide a flow changer insert, which is capable of selectively reducing the consumption by the hydraulic components to which it is coupled (for example a tap) in a quick and simple manner.

In accordance with these objects, the present invention relates to a flow changer insert as claimed in claim 15.

Finally, it is a further object of the present invention to provide a tap, which is capable of selectively reducing consumption in a quick and simple manner.

In accordance with these objects, the present invention relates to a tap as claimed in claim 18 or 19.

BRIEF DESCRIPTION OF THE DRAWINGS

Further features and advantages of the present invention will be apparent from the following description of a non-limiting embodiment thereof, with reference to the figures of the accompanying drawings, wherein:

FIGS. 13 and 14 are a front view and a sectional view along the plane XIV-XIV, respectively, of the flow changer insert in FIGS. 9 and 10 in a third operating position;

FIG. 15 is a side view, with parts in section and parts removed for clarity, of a tap according to the present invention in a first operating position.

DETAILED DESCRIPTION OF THE INVENTION

Figure 1:
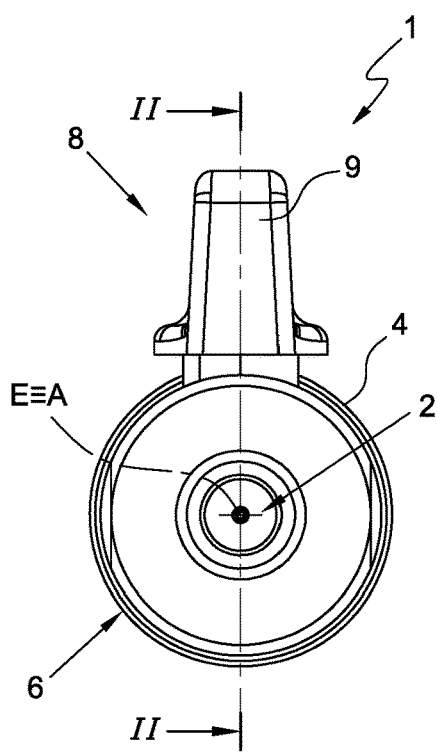
FIGS. 1 and 2 are a front view and a sectional view along the plane II-II, respectively, of a flow changer insert comprising the ball according to the present invention in a first operating position.
Figure 2:
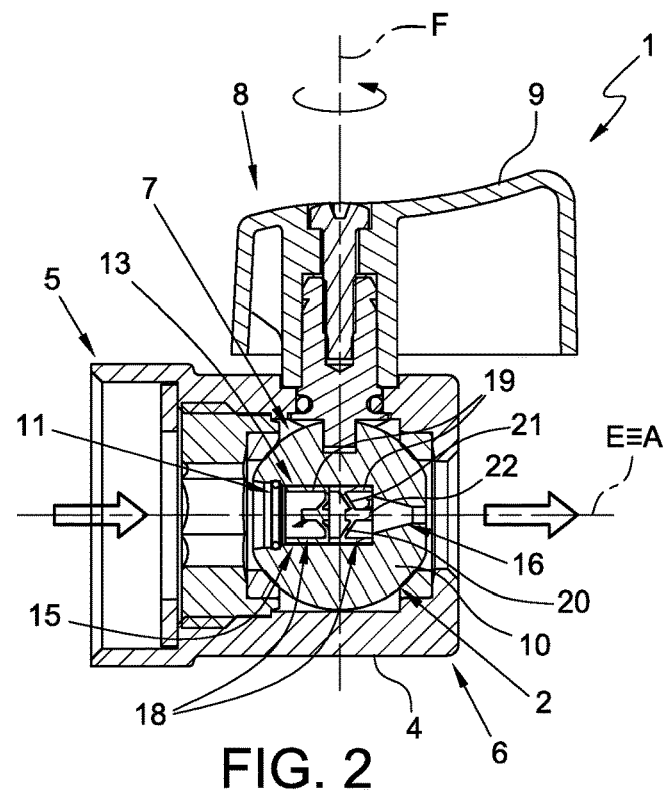

In FIGS. 1 and 2, reference number 1 indicates a flow changer insert comprising a ball 2 in accordance with the present invention.

In the non-limiting example described and illustrated herein, the ball 2 is applied to a flow changer insert 1 usable in a hydraulic circuit. For example, the flow changer insert 1 can be inserted in any position within a hydraulic circuit (even at an end position of the hydraulic circuit such as, for example, at the outlet of a tap).

It is understood that the ball according to the present invention can be integrated into any hydraulic component (for example a tap, as described in detail later, or a valve) in which a selective change in flow is needed.

The flow changer insert 1 comprises a main body 4 provided with a first connector 5 and a second connector 6, which are aligned along a main axis E, and with a housing seat 7 in fluidic communication with the first connector 5 and the second connector 6.

The first connector 5 and the second connector 6, respectively, are provided with at least one opening to allow the passage of fluid.

Preferably, the first connector 5 and/or the second connector 6 can be coupled to portions of a hydraulic circuit (for example pipes, taps, etc.).

The ball 2 is housed in the housing seat 7 and is movable inside the housing seat 7.

The flow changer insert 1 further comprises an actuator 8 coupled to the ball 2 so as to allow selective rotation of the ball about an axis F orthogonal to the main axis E.

The actuator 8 is preferably provided with a knob 9 for allowing manual adjustment of the position of the ball 2 by a user.

A non-illustrated variant provides that the actuator 8 is moved in an automated manner.

The direction of the fluid flow is approximately represented in the figures attached with arrows.

In the non-limiting example described and illustrated herein, the ball 2 comprises a spherical body 10 provided with a through channel 11, which extends along an axis A, and at least one flow changer element 13 arranged along the through channel 11.

In the non-limiting example described and illustrated herein, the through channel 11 is provided with a first cylindrical portion 15 with a constant section and with a second, substantially frustoconical portion 16.

Preferably, the flow changer element 13 is arranged along the cylindrical portion 15.

The portion 16 is sized so as to suitably direct the flow modified by the flow changer element 13.

Preferably, the flow changer element 13 is a flow rate limiter, configured to reduce the flow rate of the fluid.

In the non-limiting example described and illustrated herein, the flow changer element is a nebulizer element.

The nebulizer element is configured to nebulize the fluid passing through the through channel 11.

In particular, the nebulizer element is configured to transform the incoming liquid flow into a plurality of very small droplets so as to substantially give rise to a mist. In other words, the nebulizer element is configured to transform the incoming liquid flow into a plurality of droplets whose diameters are within the micrometer range.

The size of the droplets depends on the pressure of the fluid at the inlet of the nebulizer element. This pressure depends on the original pressure of the incoming fluid and on the position of the ball 2 with respect to the first connector 5 and the second connector 6.

In particular, the nebulizer element is configured to generate a cone jet with an even distribution.

In the non-limiting example described and illustrated herein, the nebulizer element is configured to increase the water rate and pressure so as to generate a sort of "turbine" effect, which yields a sufficiently nebulized jet.

Figure 4:
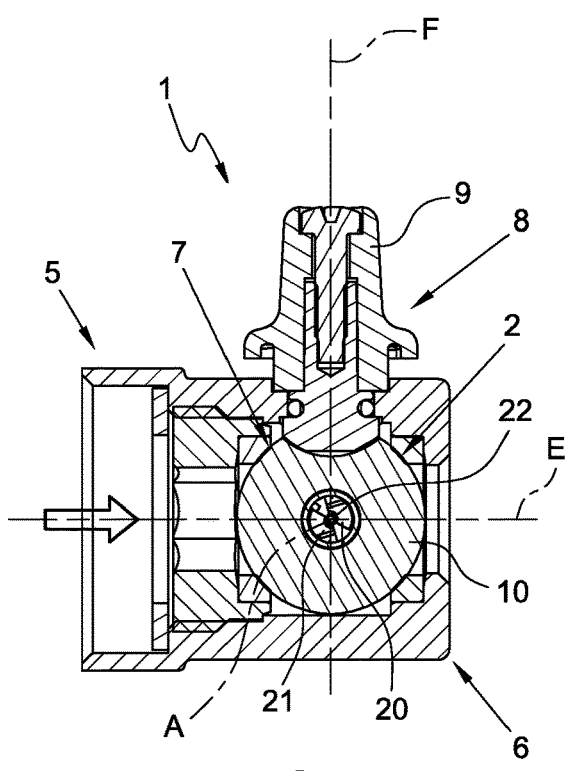
Figure 5:
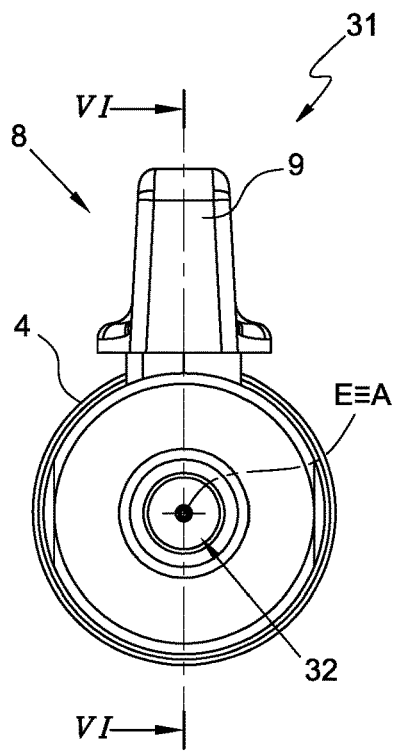
FIGS. 5 and 6 are a front view and a sectional view along the plane VI-VI, respectively, of a flow changer insert comprising the ball according to a first variant of the present invention in a first operating position.

With reference to FIGS. 2 and 4, according to a non-limiting embodiment, the nebulizer element comprises two hollow cylindrical elements 18, which are substantially identical, arranged in series in the through channel 11, and arranged coaxial with the axis A. The cylindrical elements 18 are free to rotate within the portion 15 of the through channel 11 and are axially locked in the direction of flow by the presence of a shoulder that is generated by the reduction in diameter starting from the cylindrical portion 15 to the frustoconical portion 16 of the through channel 11.

The cylindrical elements 18 are distinct and are free to rotate independently relative to one another.

A non-illustrated variant provides that the cylindrical elements 18 are made in one piece.

Each cylindrical element 18 comprises a cylindrical wall 19 and at least one inner wall 20, which is transverse to the axis A and coupled to the inner surface of the cylindrical wall 19.

Preferably, the inner wall 20 is substantially in the shape of a circular sector.

Preferably, each cylindrical element 18 comprises a further inner wall 21 (partially visible in the section of FIG. 2 and more clearly visible in the view of FIG. 4) transverse to the axis A and arranged diametrically opposite to the inner wall 20 and having equal and opposite inclination.

In other words, the inner wall 20 and the further inner wall 21 are portions of respective helical walls offset by 180°.

Preferably, the inner wall 20 and the further inner wall 21 are connected to each other by a central hub 22 extending along the axis A.

In use, the flow entering the through channel 11 impacts on the cylindrical elements 18 and makes them rotate inside the through channel 11. This results in increased rate and pressure of the fluid, thereby yielding a sufficiently nebulized jet.

In the hydraulic sector, the term "nebulizer" is sometimes replaced by the term "atomizer". It is therefore understood that the nebulizer element can also be referred to as the atomizer element.

The nebulizer element significantly reduces the incoming flow rate.

Preferably, the nebulizer element is configured to reduce the incoming flow rate by at least 70%.

In the non-limiting example described and illustrated herein, the nebulizer element is configured to reduce the incoming flow rate by 90%.

According to a variant, not shown, the flow changer element 13 is a jet-breaker device.

"Jet-breaker device" is intended to mean a flow rate limiter comprising one or more elements which are arranged in series and configured to intercept and split the flow.

For example, the jet-breaker device comprises a plurality of mesh elements superimposed on one another and at least one channeling element arranged in series with the mesh elements. The mesh elements and the channeling elements are arranged relative to one another such that, during the passage, the flow of fluid is mixed with air. For this reason, these types of jet-breaking devices are also called aerators.

Figure 3:
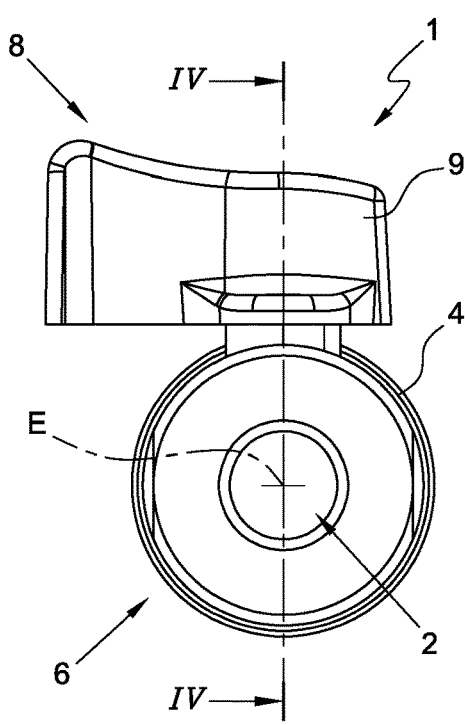
FIGS. 3 and 4 are a front view and a sectional view along the plane IV-IV, respectively, of the flow changer insert in FIGS. 1 and 2 in a second operating position.

In use, the rotation of the actuator 8 causes the rotation of the ball 2 between a first position (shown in FIGS. 1 and 2) in which the through channel 11 is fed with the incoming fluid flow (passing through the opening of the first connector 5) and a second position (shown in FIGS. 3 and 4) in which the outer surface of the ball 2 prevents the passage of fluid.

In the first position, the fluid entering the through channel 11 is changed by the flow changer element 13. In the non-limiting example described and illustrated herein, the fluid entering the through channel 11 is nebulized.

In the non-limiting example described and illustrated herein, in the first position, the axis A of the through channel 11 is substantially coincident with the main axis E. In the second position, the axis A of the through channel 11 is substantially orthogonal to the main axis E.

In this way, the transition from the first position to the second position is achieved by a simple 90° rotation of the actuator 8 and of the ball 2 coupled thereto.

Essentially, the flow changer insert 1 is capable of selectively yielding a nebulized jet or blocking the passage of fluid.

FIGS. 5, 6, 7, and 8 show a second embodiment of a flow changer insert 31.

The flow changer insert 31 is substantially identical to the flow changer insert 1 and differs only by the presence of a ball 32, which is slightly different from the ball 2.

Therefore, here and below, the reference numbers used in FIGS. 1, 2, 3, and 4 will be used to indicate identical or similar parts.

The ball 32 differs from the ball 2 by the presence of two additional through channels 35 36.

The through channel 35 extends along a respective axis B, whereas the through channel 36 extends along a respective axis C.

In the non-limiting example described and illustrated herein, the axes B and C are parallel to each other and arranged transverse to the axis A.

Preferably, the axes B and C are orthogonal to the axis A.

The through channels 35 and 36 are fluidically separated from the through channel 11 and partially extend around the through channel 11.

Figure 6:
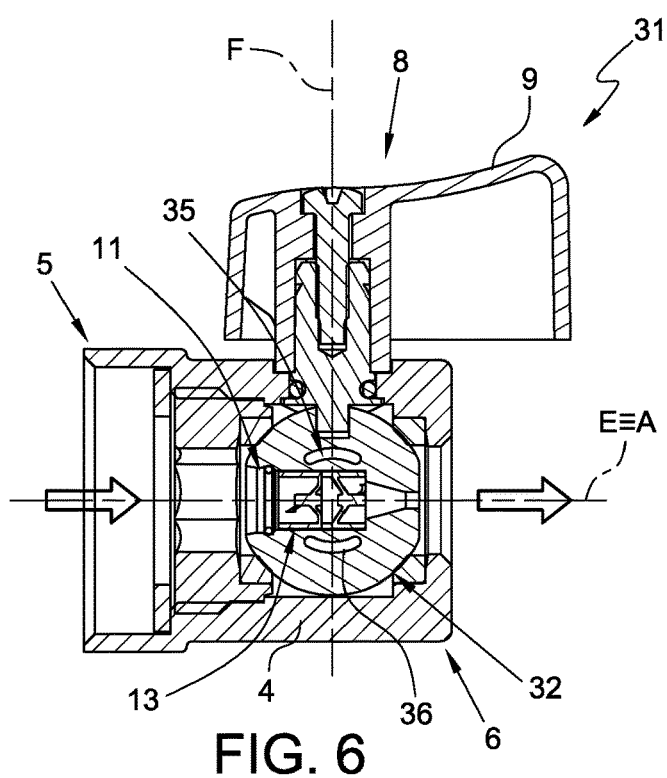
Figure 7:
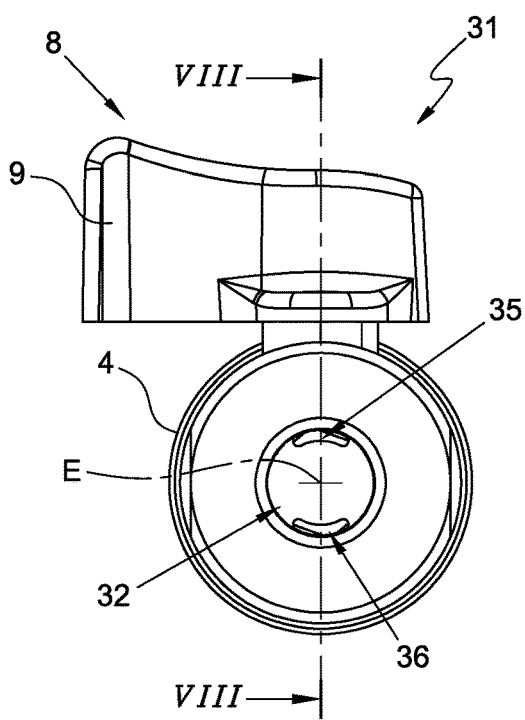
FIGS. 7 and 8 are a front view and a sectional view along the plane VIII-VIII, respectively, of the flow changer insert in FIGS. 5 and 6 in a second operating position.
Figure 8:
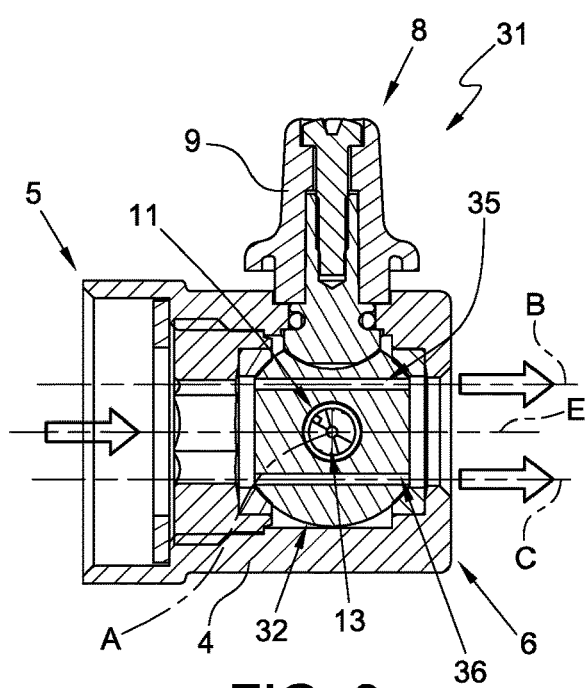
Figure 9:
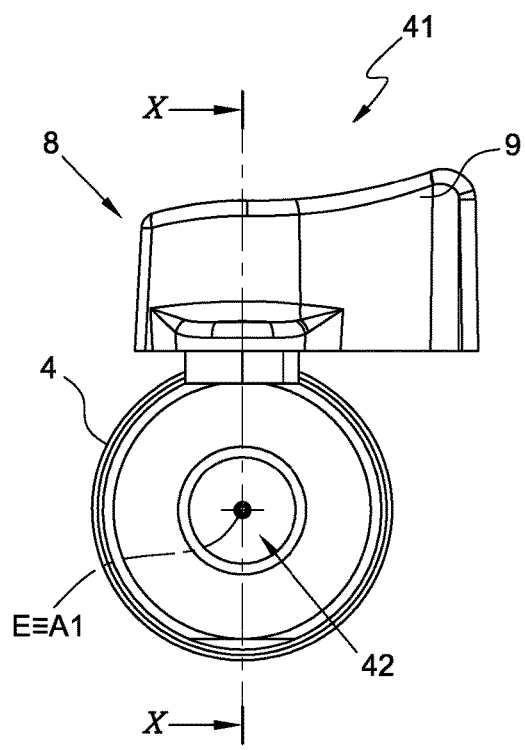
FIGS. 9 and 10 are a front view and a sectional view along the plane X-X, respectively, of a flow changer insert comprising the ball according to a second variant of the present invention in a first operating position.

Preferably, the through channel 35 and the through channel 36 have a substantially arc-shaped section and are arranged symmetrically with respect to the axis A (FIGS. 6 and 7).

In use, the rotation of the actuator 8 causes the rotation of the ball 32 between a first position (shown in FIGS. 5 and 6) in which the through channel 11 is fed with the incoming fluid flow (passing through the opening of the first connector 5) and a second position (shown in FIGS. 7 and 8) in which the through channels 35 and 36 are fed with the incoming fluid flow (passing through the opening of the first connector 5).

In the first position, the fluid entering the through channel 11 is changed by the flow changer element 13. In the non-limiting example described and illustrated herein, the fluid entering the through channel 11 is nebulized.

In the second position, the incoming fluid is conveyed into two identical through channels 35 and 36 to generate a rain jet.

In the non-limiting example described and illustrated herein, in the first position, the axis A of the through channel 11 is substantially coincident with the main axis E. In the second position, the axis A of the through channel 11 is substantially orthogonal to the main axis E, and the axes B and C are substantially parallel to the axis E.

In this way, the transition from the first position to the second position is achieved by a simple 90° rotation of the actuator 8 and of the ball 32 coupled thereto.

Essentially, the flow changer insert 31 is capable of selectively yielding a nebulized jet or a rain jet.

FIGS. 9, 10, 11, 12, 13 and 14 show a third embodiment of a flow changer insert 41.

The flow changer insert 41 is substantially identical to the flow changer insert 1 and differs only by the presence of a ball 42, which is slightly different from the ball 2.

Therefore, here and below, the reference numbers used in FIGS. 1, 2, 3 and 4 will be used to indicate identical or similar parts.

The ball 42 comprises a spherical body 50 provided with a through channel 51, which extends along an axis A1, a flow changer element 53 arranged along the through channel 51, a check valve 52 arranged along the through channel 51, and a through channel 54 (FIG. 14), which extends substantially along an axis B1.

In the non-limiting example described and illustrated herein, the through channel 51 is provided with a first, cylindrical portion 55 with a constant section and a first diameter, a second, cylindrical portion 56 with a constant section and a second diameter, which is smaller than the first diameter, and a third, substantially frustoconical portion 57 having a maximum diameter smaller than the second diameter.

Essentially, the through channel 51 has a first shoulder generated by the reduction in diameter during transition from the first portion 55 to the second portion 56, and a second shoulder generated by the reduction in diameter during transition from the second portion 56 to the third portion 57.

Preferably, the check valve 52 (schematically illustrated by a block in which the constructional details of the valve are not shown) is arranged along the first portion 55, and the flow changer element 53 is arranged along the second, cylindrical portion 56.

The portion 57 is sized so as to suitably direct the flow modified by the flow changer element 53.

The check valve 52 is configured to allow flow in one direction only. In particular, the check valve 52 is configured to allow flow towards the flow changer element 53 and block the flow coming from the flow changer element 53.

Figure 10:
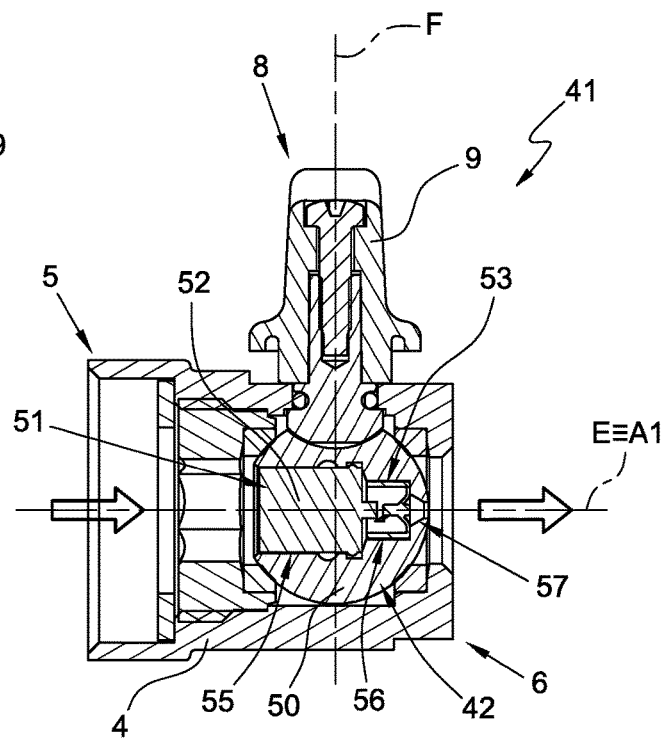
Figure 11:
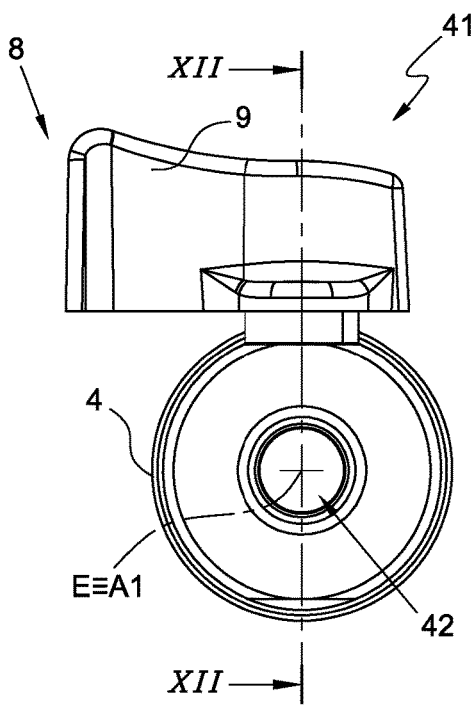
FIGS. 11 and 12 are a front view and a sectional view along the plane XII-XII, respectively, of the flow changer insert in FIGS. 9 and 10 in a second operating position.
Figure 12:
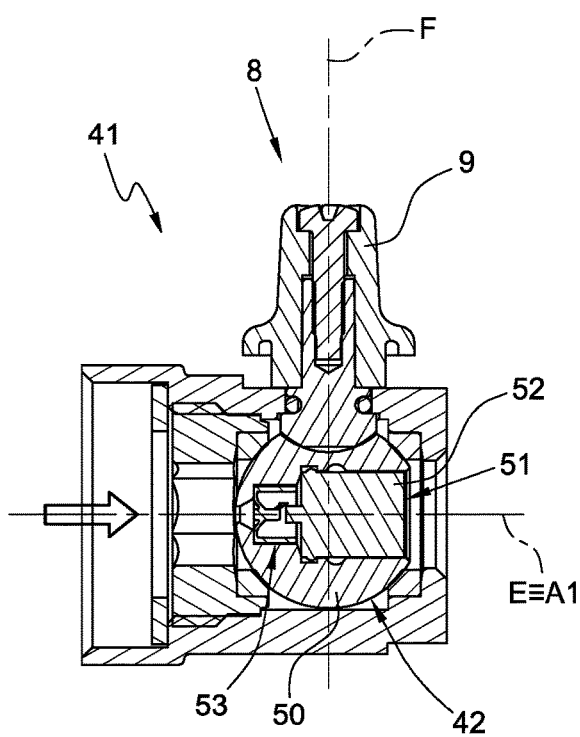

Therefore, in the configuration of FIG. 10, the check valve 52 allows the flow entering the through channel to reach the flow changer element 53, whereas in the configuration of FIG. 12, the check valve 52 closes and completely blocks the passage of fluid.

Preferably, the flow changer element 53 is a flow rate limiter, configured to reduce the flow rate of the fluid.

In the non-limiting example described and illustrated herein, the flow changer element is a nebulizer element configured to nebulize the fluid passing through the through channel 51 similarly to what has been described for the embodiment previously described with reference to FIGS. 1, 2, 3 and 4.

In the non-limiting example described herein and illustrated in FIGS. 10 and 12, the nebulizer element is configured to transform the incoming liquid flow into a plurality of very small droplets so as to substantially give rise to a mist. In other words, the nebulizer element is configured to transform the incoming liquid flow into a plurality of droplets whose diameters are within the micrometer range.

In the non-limiting example described and illustrated herein, the flow changer element 53 comprises a single cylindrical element 18 substantially identical to the cylindrical elements described with reference to FIGS. 2 and 4.

As mentioned above, the flow changer element 53 can be of a different type, for example a jet-breaker device.

The through channel 54 extends along a respective axis B1.

In the non-limiting example described and illustrated herein, the axis B1 is transverse to the axis A1, preferably orthogonal to the axis A1.

The through channel 54 is fluidically separated from the through channel 51.

With reference to FIG. 14, the through channel 51 crosses the through channel 54.

Therefore, the flow entering the through channel 54 meets the through channel 51 and surrounds it as shown schematically by the arrows.

In use, the rotation of the actuator 8 causes the rotation of the ball 42 between a first position (shown in FIGS. 9 and 10) in which the through channel 51 is fed with the incoming fluid flow (passing through the opening of the first connector 5) and the check valve 52 allows the passage of fluid to the flow changer element 53, a second position (shown in FIGS. 13 and 14) in which the through channel 54 is fed with the incoming fluid flow (passing through the opening of the first connector 5), and a third position in which the through channel 51 is fed with the incoming fluid flow (passing through the opening of the first connector 5) and the check valve 52 does not allow the passage of fluid.

Essentially, the flow changer insert 41, in the first position, yields a jet changed by the flow changer element 53, in the second position yields an unchanged jet, and in the third position yields no jet.

In the non-limiting example described and illustrated herein, in the first position, the axis A1 of the through channel 51 is substantially coincident with the main axis E. In the second position, the axis A1 of the through channel 51 is substantially orthogonal to the main axis E, and the axis B1 is substantially parallel to the axis E. In the third position, the axis A1 of the through channel 51 is again coincident with the main axis E, but the ball 52 is rotated by 180°.

In this way, transition from the first position to the second position is achieved by a simple 90° rotation of the actuator 8 and of the ball 42 coupled thereto. Transition from the second position to the third position is achieved by a simple 90° rotation of the actuator 8 and of the ball 42 coupled thereto. Transition from the first position to the third position is achieved by a simple 180° rotation of the actuator 8 and of the ball 42 coupled thereto.

Essentially, the flow changer insert 41 is capable of selectively yielding a changed jet (nebulized in the non-limiting example described and illustrated herein), an unchanged jet, and no jet.

FIG. 15 shows a further application example of the ball 2, 32, 42 according to the present invention.

This application provides that the ball 2, 32, 42 is integrated into a tap provided with a ball valve.

FIG. 15 shows a tap 70 comprising a delivery conduit 71, a supply conduit 72 and a valve 73 arranged between the delivery conduit 71 and the supply conduit 72.

The valve 73 is a ball valve provided with the above-described ball 42. Therefore, the tap 70 will have three operating positions: a position in which the flow is nebulized, a position in which the flow does not undergo significant variations, and a position in which the flow is prevented.

It is understood that the valve 73 can also comprise different types of balls, for example the above-described ball 2 or ball 32.

A non-illustrated variant provides that the tap comprises a flow changer insert (for example one of the flow changer inserts 1, 31, 41 described above) arranged upstream of the valve 73.

A further non-illustrated variant provides that the tap comprises a flow changer insert (for example one of the flow changer inserts 1, 31, 41 described above) arranged at the outlet of the delivery conduit 71.

Advantageously, the balls 2, 32, 42 according to the present invention allow the hydraulic component to which they are applied (e.g. the inserts 1, 31, 41 or the tap 70) to selectively reduce consumption.

In fact, the balls 2, 32, 42 according to the present invention are provided with at least one through channel 11, 51 provided with a flow changer element 13, 53 capable of modifying the flow.

In particular, the flow changer element 13, 53 is able to reduce the flow rate passing through the respective ball 2, 32, 42.

Moreover, the transition from a position in which the flow is modified by the flow changer element 13, 53 to a position in which the flow is blocked or is not changed is very simple. In this way, the user can select the delivery mode that best suits his/her needs in a quick and effective way.

Essentially, the ball 2, 32, 42 according to the present invention is capable of selectively yielding different types of jets depending on the requirements.

Lastly, it is clear that modifications and variations may be made to the ball, the flow changer insert and the tap described herein, without departing from the scope of the appended claims.

The invention claimed is:

1. A ball for a hydraulic component comprising:

a spherical body provided with at least one first through channel, which extends along a first axis; and at least one flow changer element arranged along the first through channel, wherein the flow changer element comprises at least one nebulizer element, the nebulizer element comprising at least one hollow cylindrical element that is free to rotate within the first through channel and that is axially locked in the direction of flow, wherein the nebulizer element is configured to transform the incoming liquid flow into a plurality of droplets whose diameters are within the micrometer range.

2. The ball according to claim 1, comprising a check valve arranged along the first through channel so as to allow the passage of flow towards the flow changer element and block the passage of the flow coming from the flow changer element.

3. The ball according to claim 1, comprising at least one second through channel, which extends along a second axis, transversal to the first axis.

4. The ball according to claim 3, wherein the second axis is orthogonal to the first axis.

5. The ball according to claim 4, comprising a third through channel, which extends along a third axis, transversal to the first axis and distinct from the second axis.

6. The ball according to claim 5, wherein the third axis is substantially parallel to the second axis.

7. The ball according to claim 5, wherein the third through channel is symmetrical to the second through channel with respect to the first axis.

8. The ball according to claim 5, wherein the third through channel has a section substantially identical to a section of the second through channel.

9. The ball according to claim 3, wherein the first through channel and the second through channel are fluidically separated.

10. The ball according to claim 9, wherein the first through channel crosses the second through channel.

11. The ball according to claim 9, wherein the second through channel extends partially around the first through channel.

12. The ball according to claim 11, wherein the second through channel has a substantially arc-shaped section.

13. A flow changer insert comprising:

a main body provided with a first connector and a second connector, which are aligned along a main axis, and with a housing seat in fluidic communication with the first connector and the second connector; and a ball, which is housed in the housing seat and is movable inside the housing seat;

the ball being of the type claimed in claim 1.

14. The insert according to claim 13, comprising an actuator coupled to the ball so as to allow selective rotation of the ball about an axis orthogonal to the main axis.

15. The insert according to claim 13, wherein an actuator is configured to move the ball between a first position in which a main axis is substantially coincident with the first axis of the first channel of the ball and at least a second position in which the first axis of the first channel of the ball is orthogonal to the main axis.

16. A tap comprising a delivery conduit, a supply conduit and a valve arranged between the delivery conduit and the supply conduit; the tap comprising at least one flow changer insert of the type claimed in claim 13.

17. A tap comprising a delivery conduit, a supply conduit and a valve arranged between the delivery conduit and the supply conduit; the valve being a ball valve provided with a ball of the type claimed in claim 1.

* * * * *